(No Model.)
L. W. TAYLOR.
FIRE EXTINGUISHER.
No. 423,355. Patented Mar. 11, 1890.
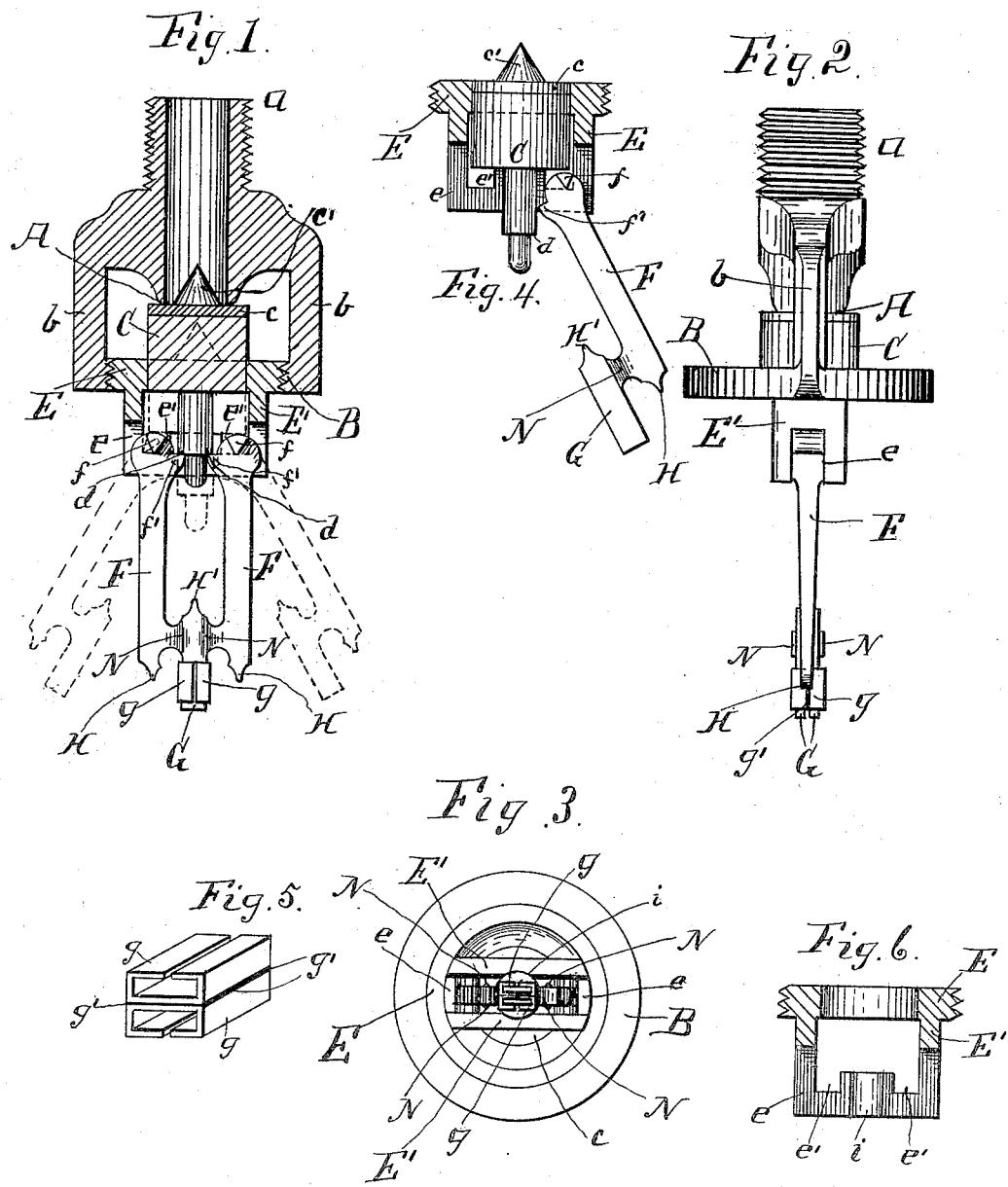
WITNESSES
Alvin Bell.
Copeland P. Jones
INVENTOR
Luke W. Taylor
By C. T. Pell,
Attorney

UNITED STATES PATENT OFFICE.

LUKE W. TAYLOR, OF SPRINGFIELD, VERMONT, ASSIGNOR OF ONE-HALF TO WILLIAM H. H. SLACK, OF SAME PLACE.

FIRE-EXTINGUISHER.

SPECIFICATION forming part of Letters Patent No. 423,355, dated March 11, 1890.

Application filed September 18, 1889. Serial No. 324,301. (No model.)

*To all whom it may concern:*

Be it known that I, LUKE W. TAYLOR, a citizen of the United States, residing at Springfield, in the county of Windsor and State of Vermont, have invented certain new and useful Improvements in Fire-Extinguishers; and I do hereby declare the following to be a full, clear, and exact description of the invention, such as will enable others skilled in the art to which it appertains to make and use the same.

This invention relates to fire-extinguishers, which are adapted to be automatically brought into action by the heat of the fire; and it consists in the novel construction and combination of the parts, hereinafter fully described and claimed.

In the drawings, Figure 1 is a side view of the extinguisher, showing the valve-seat and the adjusting-nut in section. Fig. 2 is a side view of the extinguisher turned one-quarter around from the position shown in Fig. 1. Fig. 3 is an end view of the extinguisher. The dotted lines in Fig. 1 show the position of the parts when the device is in operation and the arms are forced apart. Fig. 4 is a detached sectional view of the adjusting-nut, showing the longitudinal slot and the cross-notches with the valve, valve-stem, and one of my improved arms in elevation. Fig. 5 is an enlarged perspective view of my links. Fig. 6 is a detached sectional view of the adjustable nut and yoke, showing the guideway for the valve-stem.

A is the valve-seat provided with the screw-threaded stem $a$ for securing it to the end of a water-supply pipe in any convenient position.

B is an internally-screw-threaded ring, which is connected with the stem below the valve-seat by the supports $b$, and all the said parts being formed of a solid piece of metal.

C is the valve provided with the face $c$ of soft metal for bearing against the sharp valve-seat, and with a conical projection $c$ which enters the stem and causes the valve to take its proper position on the valve-seat when pressed toward it.

D is the valve-stem formed integral with the valve and having the shoulder $d$ near its end.

E is the adjusting-nut which forms a guide for the valve, and which is screwed into the ring B.

E' is a yoke upon the back of nut E. This yoke is provided with the longitudinal slot $e$ and the cross-notches $e'$. The inner sides of the yoke forming the longitudinal slot have grooves formed therein to assist in guiding the valve-stem through said yoke.

F F are the arms provided with knife-edge pivots $f$, which bear against the bottoms of the notches $e'$ and permit the arms to project through the said longitudinal slot. The arms F are further provided with the oppositely-arranged projections $f'$, which bear against the shoulders $d$ on the valve-stem and normally hold the valve against its seat when the adjusting-nut is screwed down.

G are flat plates formed upon the ends of the arms F and adapted to overlap each other. Each plate G is provided with a link $g$, and the two links are joined together back to back by a small quantity of solder $g'$, or other similar material, which melts at a low temperature. The links are joined together and are then slid over the plates G on the ends of said arms, so that the arms are retained in the position indicated by the full lines in Fig. 1 and hold the valve closed as long as the solder remains unmelted. When a fire breaks out in the vicinity of the device, the heat melts the solder and the pressure of the water forces the valve outward from the valve-face and turns the arms to the position indicated by the dotted lines in Fig. 1.

H are projections upon the ends of the arms and N are projections upon the sides of the arms. Any water which may leak past the valve and run down the arm will collect upon and drop off these projections instead of running into the solder, and preventing it from melting until the fire has made considerable headway. The upper drip projection H' is provided that, in case the extinguisher be turned upside down in hanging it up or restoring it to its proper place after having been used, the said projection will afford ready means for carrying off the water and prevent it from running down the arms onto the pivots, thus preventing the pivot-edges from rust, &c.

What I claim is—

1. In a fire-extinguisher, the combination, with the valve and its stem, of the adjustable nut provided with a yoke having the longitudinal slot $e$ and the cross-notches $e'$, the arms having knife-edge bearings pivotally supported in the said cross-notches and holding the said valve closed, and the links united by solder and retaining the free ends of said arms, substantially as shown and described, and for the purpose set forth.

2. In a fire-extinguisher, the combination, with the valve, of the pivotally-supported arms for keeping the valve in position provided with the water-drip projections H and N, and having overlapping plates beyond said projections, and the links united by solder and slid upon said plates for retaining the arms, substantially as set forth.

3. In a fire-extinguisher, the combination, with the valve-seat provided with the internally-screw-threaded ring B, of the nut engaging with said ring and provided with a yoke having the longitudinal slot $e$ and the cross-notches $e'$, the valve guided by said nut with its stem guided in the yoke, the arms provided with knife-edges pivoted in said cross-slots and projections for keeping the valve in position, and the links united by solder and normally connecting the ends of the arms together, substantially as and for the purpose set forth.

In testimony whereof I affix my signature in presence of two witnesses.

LUKE W. TAYLOR.

Witnesses:
 LOREN B. HURD,
 A. M. ALLBE.